United States Patent
Roy-Auberger et al.

(10) Patent No.: US 10,076,746 B2
(45) Date of Patent: Sep. 18, 2018

(54) PROCESS FOR THE PREPARATION OF A CATALYST, CATALYST AND ITS USE IN A HYDROCONVERSION AND/OR HYDROTREATMENT PROCESS

(71) Applicant: IFP Energies nouvelles, Rueil-Malmaison (FR)

(72) Inventors: Magalie Roy-Auberger, Nivolas-Vermelle (FR); Ali Jahel, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 141 days.

(21) Appl. No.: 15/103,583

(22) PCT Filed: Dec. 8, 2014

(86) PCT No.: PCT/EP2014/076939
§ 371 (c)(1),
(2) Date: Jun. 10, 2016

(87) PCT Pub. No.: WO2015/086541
PCT Pub. Date: Jun. 18, 2015

(65) Prior Publication Data
US 2016/0303546 A1 Oct. 20, 2016

(30) Foreign Application Priority Data

Dec. 13, 2013 (FR) ..................... 13 62559

(51) Int. Cl.
| *B01J 27/19* | (2006.01) |
| *B01J 37/20* | (2006.01) |
| *B01J 23/882* | (2006.01) |
| *B01J 31/02* | (2006.01) |
| *B01J 31/04* | (2006.01) |
| *B01J 37/02* | (2006.01) |
| *C10G 45/08* | (2006.01) |
| *B01J 37/28* | (2006.01) |
| *B01J 35/10* | (2006.01) |
| *B01J 37/08* | (2006.01) |
| *C10G 45/50* | (2006.01) |
| *B01J 23/883* | (2006.01) |

(52) U.S. Cl.
CPC ............ *B01J 27/19* (2013.01); *B01J 23/882* (2013.01); *B01J 31/0202* (2013.01); *B01J 31/0237* (2013.01); *B01J 31/0271* (2013.01); *B01J 31/04* (2013.01); *B01J 35/1019* (2013.01); *B01J 37/0203* (2013.01); *B01J 37/0207* (2013.01); *B01J 37/0236* (2013.01); *B01J 37/08* (2013.01); *B01J 37/20* (2013.01); *B01J 37/28* (2013.01); *C10G 45/08* (2013.01); *C10G 45/50* (2013.01); *B01J 23/883* (2013.01); *C10G 2300/703* (2013.01)

(58) Field of Classification Search
CPC combination set(s) only.
See application file for complete search history.

(56) References Cited

U.S. PATENT DOCUMENTS

| 2007/0072765 | A1 | 3/2007 | Soled et al. |
| 2011/0294656 | A1 | 12/2011 | Soled et al. |
| 2012/0205292 | A1 | 8/2012 | Gabrielov et al. |
| 2013/0261362 | A1* | 10/2013 | Fingland ............... B01J 23/002 585/324 |

OTHER PUBLICATIONS

International Search Report dated Jan. 14, 2015, issued in corresponding PCT/EP2014/076939, 3 pages.

* cited by examiner

Primary Examiner — Randy Boyer
Assistant Examiner — Juan C Valencia
(74) Attorney, Agent, or Firm — Millen White Zelano and Branigan, PC; Csaba Henter

(57) ABSTRACT

The invention concerns a process for the preparation of a catalyst starting from a pre-catalyst comprising at least one catalytic metal and a support, said pre-catalyst having undergone a heat treatment at at least 60° C. without calcining, in which process said pre-catalyst is impregnated with a basic solution having a pH of more than 7.5 and containing at least one molecule in the zwitterionic form, and the impregnated pre-catalyst is dried at a temperature of at most 240° C. without subsequent calcining.

The molecule in the zeolite form is selected from the group formed by amino-alcohol acids containing secondary or tertiary amine groups and containing at least one carboxylic acid function (and preferably only one) and at least one alcohol function. It is bicine or tricine, for example.

The invention also concerns the catalyst prepared using this process, and its use in hydrotreatment and/or hydroconversion.

20 Claims, No Drawings

PROCESS FOR THE PREPARATION OF A CATALYST, CATALYST AND ITS USE IN A HYDROCONVERSION AND/OR HYDROTREATMENT PROCESS

FIELD OF THE INVENTION

The invention relates to a catalyst, its preparation method and its use in a hydrocracking and/or hydrotreatment process.

In general, a catalyst for the hydrotreatment of hydrocarbon cuts is intended to eliminate sulphur-containing, nitrogen-containing or aromatic compounds contained therein in order, for example, to bring an oil product to the required specifications (sulphur content, aromatics content, etc.) for a given application (automobile fuel, gasoline or diesel, domestic fuel, jet fuel etc.). It may also act to pre-treat this feed in order in order to eliminate impurities therefrom before it undergoes the various transformation processes to modify its physico-chemical properties such as, for example, in reforming processes, vacuum distillate hydrocracking processes, catalytic cracking, or hydroconversion of atmospheric or vacuum residues. The composition and use of hydrotreatment catalysts have in particular been described in the article by B. S. Clausen, H. T. Topsøe, and F. E. Massoth, published in Catalysis Science and Technology, volume 11 (1996), Springer-Verlag. After sulphurization, several surface species are present on the support; they do not all perform well in the desired reactions. These species have been described particularly comprehensively, for example, in the publication issued by Topsøe et al in issue number 26 of Catalysis Review Science and Engineering of 1984, pages 395-420.

Tightening of automobile pollution standards in the European Community (Journal Officiel de L'Union européenne [Official Journal of the European Union] L76, $22^{nd}$ March 2003, Directive 2003/70/CE, pages L76/10-L76/19) has constrained refiners to reduce to a very substantial extent the sulphur content in diesel fuels and gasolines (to a maximum of 10 parts per million by weight (ppm) of sulphur on $1^{st}$ January 2009, in contrast to 50 ppm on $1^{st}$ January 2005). Further, refiners are being constrained to use more and more refractory feeds in hydrotreatment processes, on the one hand because crudes are becoming heavier and heavier and as a result contain more and more impurities, and on the other hand because of the increase in conversion processes in the refineries. In fact, these generate oil cuts which are more difficult to hydrotreat than cuts obtained directly from atmospheric distillation. By way of example, the diesel cut obtained from catalytic cracking, also known as LCO (Light Cycle Oil), referring to its high aromatic compound content, may be mentioned. These cuts may be treated jointly with the diesel cut obtained from atmospheric distillation. They require greatly improved catalysts with hydrodesulphurizing and hydrogenating functions compared with traditional catalysts in order to reduce the aromatics content and obtain a density and a cetane number which complies with specifications.

Furthermore, conversion processes such as catalytic cracking or hydrocracking use catalysts with an acidic function, which makes them particularly sensitive to the presence of nitrogen-containing impurities, and particularly to the presence of basic nitrogen-containing compounds. Thus, it is necessary to use pre-treatment catalysts for these feeds in order to remove those compounds. These hydrotreatment catalysts also require an improved hydrogenating function because the first hydrodenitrogenation step is recognized as being a step for hydrogenation of the aromatic ring adjacent to the C-N bond.

Thus, it would be advantageous to find means for preparing hydrotreatment catalysts in order to obtain novel catalysts with improved performances.

In this context, methods for improving the activity of the catalysts by adding organic molecules at various stages in the preparation of the catalysts have been intensively studied for about thirty years.

PRIOR ART

Adding organic molecule(s) during the preparation of hydrotreatment and hydroconversion catalysts is a well-known method for improving the performance of hydrotreatment and hydroconversion catalysts. A wide variety of molecules has been tested since the end of the 1980s.

As an example, EP 0601722 from Sumitomo may be cited; it describes additives containing 2 or 3 alcohol functions and 2 to 10 carbon atoms, as well as ethers of these alcohols and monosaccharide and disaccharide sugars. The additive is added to a solution of metals from groups VIB and VIII in the presence of $H_3PO_4$.

More recently, Albemarle has described adding an additive to a catalyst the metals of which are in the oxide form, the additive being a mixture of acid and another additive with a boiling point in the range 80° C. to 500° C. and a solubility of more than 5 g/L. Optionally, a final heat treatment leaving at least 50% of the additive on the catalyst is carried out (WO 2005/035691).

IFP Energies nouvelles has filed patent application FR 02917647 concerning adding an additive to a hydrotreatment catalyst based on an amorphous support containing a metal from group VIB and a metal from group VIII which has been dried or calcined. Next, the catalyst is impregnated with a solution containing phosphorus and one or more solvents the dielectric constants of which are more than 20 (such as methanol, ethanol, etc.). Here again, the catalysts are impregnated in an acid medium.

In 2011, Petrochina filed patent application EP 2 540 392 describing adding a polyamine and ammonia to a metallic solution for impregnation (by immersion) of a support for the preparation of a hydrotreatment catalyst. Introduction of the metals and polyamine is followed by drying and calcining at 350-600° C. That preparation method was used to improve the performances of catalysts in hydrodesulphurization and hydrodenitrogenation. The polyamines cited were EDTA, triethylenediamine, triethanolamine and ethylene diamine.

ADVANTAGES OF THE INVENTION

The research work carried out by the Applicant on adding carbonaceous molecules during the preparation of hydrotreatment and/or hydroconversion catalysts have led to the discovery that a catalyst comprising an active phase containing at least one hydrodehydrogenating element selected from elements from group VIB and non-noble group VIII of the periodic classification of the elements, taken alone or as a mixture, and an amorphous or partially crystalline oxide support optionally containing at least one doping element in a controlled quantity selected from phosphorus, boron and silicon, and optionally an element from group VIIA of the periodic classification of the elements, and prepared by impregnation of a solution containing at least one organic element of the zwitterionic type in a basic medium can be used to obtain a higher activity, i.e. a higher degree of hydrotreatment and/or hydroconversion.

BRIEF DESCRIPTION OF THE CATALYST PREPARATION PROCESS OF THE INVENTION

The invention concerns a process for the preparation of a catalyst starting from a pre-catalyst comprising at least one catalytic metal and a support, said pre-catalyst having undergone a heat treatment at at least 60° C. without calcining, in which process said pre-catalyst is impregnated with a basic solution having a pH of more than 7.5 and containing at least one molecule in the zwitterionic form, and the impregnated pre-catalyst is dried at a temperature of at most 240° C. without subsequent calcining.

An organic molecule of a zwitterionic type, generally known as a zwitterion, is a molecular chemical species having formal electric charges in one unit, with opposing signs and generally located on non-adjacent atoms.

The molecule in the zwitterionic form is selected from the group formed by amino-alcohol acids containing secondary or tertiary amine groups and containing at least one carboxylic acid function and at least one alcohol function.

More preferably, the molecule has a single carboxylic acid function. It may be bicine or tricine, for example.

The pH for impregnation is generally more than 8.5, preferably more than 10. The base used is usually ammonia.

In general, the molecule in the zwitterionic form is added in a quantity such that the molar ratio of zwitterionic molecule/GVIB and more particularly the molar ratio of molecule/Mo, is in the range 0.05 to 2.0.

After impregnation, the pre-catalyst undergoes a maturation step, preferably for 0.1 to 10 h and at a temperature of 15° C. to 80° C. Advantageously, drying is carried out at a temperature in the range 50° C. to 240° C. Drying is preferably carried out after maturation.

As an example, the pre-catalyst comprises at least one catalytic metal selected from the group formed by metals from groups VIB and non-noble VIII, and optionally comprises a promoter element selected from the group formed by phosphorus, boron and silicon, and preferably phosphorus.

In general, the pre-catalyst has been prepared by dry impregnation of said support with a solution of said catalytic metal. In general, the pre-catalyst has been heat treated at a temperature in the range 60° C. to 220° C.

Said catalyst undergoes sulphurization after said drying, in a manner so as to form the active metallic phase, for example for hydroconversion and/or hydrocracking processes.

The invention also concerns the catalyst prepared using the process described above.

It also concerns a process for the hydrotreatment and/or hydroconversion of a hydrocarbon feed by bringing said feed into contact with the catalyst described above, in which process said catalyst contains at least one metal from group VIB and at least one metal from group VIII and said metals are in the sulphide form.

DETAILED DESCRIPTION OF THE PROCESS FOR THE PREPARATION OF THE CATALYST IN ACCORDANCE WITH THE INVENTION

The process for the preparation of the catalyst in accordance with the invention comprises the following steps in succession starting from a support based on at least one porous mineral matrix which has been shaped and which has undergone a heat treatment (this product will be termed the "support"):

a) impregnation of the support with an impregnating solution containing at least one catalytic metal; preferably, the solution contains at least one catalytic metal from group VIB and at least one catalytic metal from non-noble group VIII; impregnation is followed by optional maturation; the product obtained will be termed the "impregnated support".

b) heat treatment at at least 60° C. without subsequent calcining, preferably at a temperature of at most 220° C.; the product obtained will be termed the "pre-catalyst".

c) impregnation of the pre-catalyst with a basic impregnating solution comprising at least one organic molecule termed a zwitterion as defined hereinabove, followed by optional maturation; the product obtained will be termed the "impregnated pre-catalyst".

e) drying at a temperature of at most 240° C. and usually less than 220° C., without subsequent calcining; the product obtained will be termed the "catalyst".

Process for Preparing the "Support" in Accordance with the Invention

The support for the catalyst in accordance with the invention is advantageously prepared from a porous amorphous mineral matrix based on at least one refractory oxide containing or not containing a zeolite.

The porous mineral matrix is advantageously selected from the group formed by alumina, silica, clays, titanium oxide, oxides of boron or phosphorus and zirconium, used alone or as a mixture. In the context of the invention, it is preferable to use matrices containing mainly alumina, in all of the forms known to the person skilled in the art, for example in the form of gamma alumina. It is also advantageous to use mixtures of alumina and silica, mixtures of alumina and silica-alumina, mixtures of aluminas and zeolites, or indeed mixtures of aluminas, silica-alumina and zeolites. Preferably, the support for the catalyst in accordance with the invention contains only alumina or silica-alumina, optionally with metal(s) and/or dopants(s) which have been introduced outside the impregnation steps (group VIB, group VIII, P, Si, F, etc.) before or during shaping of the support.

The support may advantageously be shaped using any technique which is known to the person skilled in the art. Shaping may be carried out, for example, by extrusion, pelletization, by the oil drop method, by rotary plate granulation or using any other method which is well known to the person skilled in the art. The catalysts of the invention may optionally be manufactured and used in the form of crushed powder, extrudates, tablets, rings, beads or wheels. The advantageous method for shaping in accordance with the invention is extrusion and the preferred extrudate shape is that of a cylinder (which may or may not be hollow), twisted cylinder or multilobe (2, 3, 4 or 5 lobes, for example). It is also advantageous for the catalyst to be in the form of extrudates with a diameter in the range 0.4 to 5 mm, and more particularly in the range 0.9 to 2.5 mm. The shaped solid is then dried at a temperature in the range 60° C. to 250° C. and calcined at a temperature in the range 250° C. to 800° C. for a period in the range 30 minutes to 6 hours in order to provide a support as defined in the context of the invention.

Process for the Preparation of the "Impregnated Support" in Accordance with the Invention The catalytic metal (metals) is (are) introduced by impregnation of an aqueous solution onto the support as defined in the context of the invention.

Preferably, at least one metal from group VIB and at least one metal from non-noble group VIII of the periodic classification of the elements are introduced, and optionally at least one promoter element from group VIIA and optionally at least one element from group VB such as phosphorus.

The impregnation of various metals/elements may be carried out in one or more steps. The impregnation of the solution may be carried out using any of the methods which are well known to the person skilled in the art, i.e. by one or more operations for impregnating a support as defined in the context of the invention using a solution containing precursors of the metal or metals and optionally containing the precursor of at least one promoter element such as phosphorus and optionally the precursor of at least one element from group VIIA and/or group VB.

Any of the metals from group VIB may be used for the purposes of the invention. Preferably, the metals from group VIB used in accordance with the invention are tungsten and molybdenum, used alone or as a mixture. More preferably, the metal from group VIB in accordance with the invention is molybdenum.

The sources of molybdenum and tungsten are advantageously selected from oxides and hydroxides, molybdic and tungstic acids and their salts, in particular their ammonium salts such as ammonium molybdate, ammonium heptamolybdate, ammonium tungstate, phosphomolybdic acid, phosphotungstic acid and their salts, silicomolybdic acid, silicotungstic acid and their salts. Preferably, the oxides and ammonium salts such as ammonium molybdate, ammonium heptamolybdate and ammonium tungstate are used.

Any of the non-noble metals from group VIII may be used for the purposes of the invention. Preferably, the non-noble metals from group VIII used in accordance with the invention are nickel and cobalt, used alone or as a mixture.

The catalytic metals are generally a combination of metals from group VIII (preferably Co and/or Ni) and metals from group VIB (preferably Mo). The sources of the non-noble metal from group VIII which may be used are well known to the person skilled in the art. As an example, for the non-noble metals, nitrates, sulphates, hydroxides, phosphates, halides, for example chlorides, bromides and fluorides, and carboxylates such as acetates and carbonates, for example, will be used.

In general, the total content of the hydro-dehydrogenating elements, i.e. of metal(s) from group VIII and metal(s) from group VIB, is more than 6% by weight of metals from groups VIB and VIII (calculated with respect to the oxide) with respect to the total weight of pre-catalyst; preferably, it is in the range 5% to 50% by weight of the metals (calculated with respect to the oxide) from groups VIB and VIII with respect to the total weight of the pre-catalyst. The content of metal(s) from group VIB is in the range 4% to 40% of the weight of the metal(s) (calculated with respect to the oxide) from group VIB with respect to the total weight of pre-catalyst, preferably in the range 8% to 35% by weight and still more preferably in the range 10% to 30% by weight of metal(s) (calculated with respect to the oxide) from group VIB with respect to the total weight of the pre-catalyst. The content of metal(s) from group VIII is in the range 1% to 10% by weight of metal(s) (calculated with respect to the oxide) from group VIII with respect to the total weight of pre-catalyst, preferably in the range 1.5% to 9% by weight and more preferably in the range 2% to 8% by weight of metal(s) (calculated with respect to the oxide) from group VIII with respect to the total weight of pre-catalyst. The percentages by weight of metals from groups VIII and VIB indicated above are expressed with respect to the total weight of pre-catalyst for the preparation process in accordance with the invention.

The molar ratio of metal(s) from group VIII to metal(s) from group VIB in the catalyst is preferably in the range 0.05 to 0.9, highly preferably in the range 0.1 to 0.8, and still more preferably in the range 0.2 to 0.6.

A promoter element from group VB which is preferred for the purposes of the invention is phosphorus. The preferred source of phosphorus is orthophosphoric acid, $H_3PO_4$, but its salts and esters such as ammonium phosphates are also suitable. The phosphorus may, for example, be introduced in the form of a mixture of phosphoric acid and a basic organic compound containing nitrogen such as ammonia, primary and secondary amines, cyclic amines, compounds from the pyridine family and quinolines and compounds from the pyrrole family. Tungstophosphoric and tungstomolybdic acids may be employed.

The phosphorus content is adjusted, although this does not limit the scope of the invention, in a manner such as to form a mixed compound in solution and/or on the support, for example tungsten-phosphorus or molybdenum-tungsten-phosphorus. These mixed compounds may be heteropolyanions. These compounds may be Anderson heteropolyanions, for example. The phosphorus may also be introduced at the same time as the element(s) from group VIB in the form of Keggin, lacunary Keggin, substituted Keggin or Strandberg type heteropolyanions.

The phosphorus content is preferably in the range 0.1% to 20% by weight of $P_2O_5$, more preferably in the range 0.2% to 15% by weight of $P_2O_5$, highly preferably in the range 0.3% to 10% by weight of $P_2O_5$. The percentage is expressed with respect to the total weight of pre-catalyst for the preparation process in accordance with the invention. When the catalyst contains at least one metal from group VIB, the quantity of phosphorus is such that the molar ratio of phosphorus to metal(s) from group VIB in the pre-catalyst is 0.11 or more, preferably 0.25 or more, and more preferably 2 or even 1.4 or less.

After impregnation, the sample is then matured for between 15 min and 10 h, preferably in the range 30 min to 5 h, and more preferably in the range 1 h to 4 h in order to obtain the impregnated support in accordance with the invention.

After impregnation and optional maturation, the impregnated support is then dried at a temperature in the range 60° C. to 220° C. in order to obtain the pre-catalyst in accordance with the invention.

Process for the Preparation of the "Impregnated Pre-catalyst" in Accordance with the Invention The pre-catalyst of the invention is then impregnated with a solution containing at least one organic molecule of the zwitterionic type (which will also be termed a zwitterion in the text) in a basic medium. In the context of the invention, zwitterions are amino-alcohol acids containing secondary or tertiary amine groups and containing at least one carboxylic acid function and at least one alcohol function. Preferably, the zwitterion has a single carboxylic acid function.

More preferably, more specific preferred zwitterions are bicine and tricine. A spatial representation of bicine (A) and tricine (B) is given below:

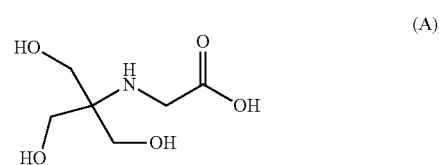

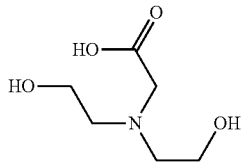

The quantity of "zwitterionic" molecule added is adjusted to the quantity of metal from group VIB engaged in a manner such that the zwitterion/metal from group VIB molar ratio, and more particularly the zwitterionic molecule/Mo molar ratio, is in the range 0.05 to 2.0, preferably in the range 0.2 to 1.5.

The pH for impregnation of the solution containing the zwitterions and the base must be more than 7.5, preferably more than 8.5 and more preferably more than 10.0. The base used is usually ammonia.

In general, a single impregnation step is sufficient. This provides savings as regards industrialization, and simplifies the impregnation line, especially if an intermediate drying stage is necessary between the impregnation steps.

Preferably, after the impregnation step, the impregnated pre-catalyst then undergoes a maturation step. Preferably, it is carried out for a period in the range 0.1 to 10 h, preferably in the range 0.5 to 7 h and more preferably in the range 1 to 5 h, and at a temperature in the range 15° C. to 80° C., preferably in the range 20° C. to 50° C.

After impregnation and preferably after maturation, the impregnated pre-catalyst undergoes a drying step carried out at a temperature in the range 50° C. to 240° C., preferably in the range 65° C. to 220° C. and highly preferably in the range 75° C. to 200° C. The drying step may be carried out either in oxygen, air or nitrogen or a mixture of these gases. The catalyst is then obtained.

There is no subsequent calcining step, i.e. a step carried out after drying. Clearly, in accordance with the invention, the drying temperatures are not calcining temperatures. The invention does not concern calcined or regenerated catalysts. It only concerns catalysts termed fresh catalysts or new (unused) catalysts and which are dried.

Process for the Preparation of the "Sulphurized Catalyst" in Accordance with the Invention The process for the preparation of the catalyst in accordance with the invention advantageously comprises at least one sulphurization step.

The active phase of the catalyst is in the sulphide form. The catalyst may then be used in a process for hydrotreatment and/or hydroconversion, as will be described below in the present description.

This activation treatment by sulphurization is well known to the person skilled in the art and may be carried out using any method known to the person skilled in the art. Sulphurization is carried out by bringing the catalyst prepared in accordance with the process of the invention into contact with at least one decomposable sulphur-containing organic compound which generates $H_2S$ or by direct contact of the catalyst with a stream of gaseous $H_2S$, for example diluted in hydrogen. The organic sulphur-containing compound is advantageously selected from alkyldisulphides such as dimethyldisulphide (DMDS), alkylsulphides such as dimethyl sulphide, mercaptans such as n-butylmercaptan, polysulphide compounds of the tertiononylpolysulphide type such as TPS-37 or TPS-54 sold by ARKEMA, or any other compound known to the person skilled in the art for obtaining good sulphurization of a catalyst. The sulphurization may be carried out in situ (i.e. after charging the catalyst into the reaction unit of the hydrotreatment and/or hydroconversion process) or ex-situ (i.e. before charging the catalyst into the reaction unit) at a temperature which is generally in the range 200° C. to 600° C., more preferably in the range 300° C. to 500° C.

Processes Using the Catalyst of the Invention

The catalysts obtained by the process of the invention are advantageously used for reactions for the hydrotreatment or hydroconversion of hydrocarbon feeds such as oil cuts, cuts obtained from coal or hydrocarbons produced from natural gas. The term "hydrotreatment" should be understood to mean hydrogenation, hydrodenitrogenation, hydrodearomatization, hydrodesulphurization, and hydrodemetallization reactions.

These catalysts may advantageously be used during mild hydrocracking operated as a pre-treatment of catalytic cracking or hydrocracking feeds. They may also be used for the hydrodesulphurization of residues. These catalysts have remarkable performances in processes for the intense hydrodesulphurization of diesels (ULSD—Ultra Low Sulphur Diesel) or for processes intended to obtain an improved cetane number.

When utilized in this manner, the catalysts obtained by the process in accordance with the invention have improved performances, in particular an improved activity, compared with prior art catalysts.

The feeds employed in the hydrotreatment processes are, for example kerosenes, gas oils, vacuum gas oils, atmospheric residues, vacuum residues, atmospheric distillates, vacuum distillates, deasphalted residues or crudes, feeds obtained from thermal or catalytic conversion processes, feeds obtained from biomass, used alone or as a mixture. The feeds which are treated, in particular those mentioned above, generally contain heteroatoms such as sulphur, oxygen and nitrogen and, for the heavy feeds, they usually also contain metals originating from the treated feeds and which deactivate the catalyst.

The operating conditions used in the processes for the hydrotreatment and/or hydroconversion of hydrocarbon feeds are generally as follows: the temperature is advantageously in the range 180° C. to 450° C., preferably in the range 250° C. to 440° C., the pressure is advantageously in the range 0.5 to 300 bar, preferably in the range 1 to 180 bar, the hourly space velocity is advantageously in the range 0.1 to 20 $h^{-1}$, preferably in the range 0.2 to 5 $h^{-1}$, and the hydrogen/feed ratio, expressed as the volume of hydrogen, measured under normal temperature and pressure conditions, per volume of liquid feed is advantageously in the range 50 L/L to 2000 L/L.

The examples below demonstrate the large increase in activity with the utilization of the invention of catalysts prepared in accordance with the invention compared with prior art catalysts, and describe the invention without in any way limiting its scope.

EXAMPLE 1

Preparation of CoMoP Catalysts on Alumina A1 and A2 (Not in Accordance with the Invention)

A matrix composed of alumina gel sold under the name SB3 by Condéa Chemie GmbH was used. This gel was mixed with an aqueous solution containing 66% nitric acid (7% by weight of acid per gram of dry gel) then mixed for 15 minutes. At the end of this mixing, the paste obtained was passed through a die with cylindrical orifices with a diameter of 1.6 mm. The extrudates were then dried overnight at 120° C., and calcined at 600° C. for 2 hours in moist air containing 50 g of water per kg of dry air. Extrudates of a support were thus obtained which had a specific surface area of 300 m²/g. X-ray diffraction analysis revealed that the support was solely composed of low crystallinity cubic gamma alumina.

Cobalt, molybdenum and phosphorus were added to the alumina support described above and in the form of "extrudates". The impregnating solution was prepared by hot dissolution of molybdenum oxide (24.34 g) and cobalt hydroxide (5.34 g) to the solution of phosphoric acid (7.47 g) in aqueous solution. After dry impregnation, the extrudates were allowed to mature in a water-saturated atmosphere for 12 h, then dried overnight at 90° C. The dried pre-catalyst obtained thereby was denoted A1.

Calcining of the catalytic precursor A1 at 450° C. for 2 hours produced a calcined pre-catalyst A2, which was not in accordance with the invention.

The final composition of catalysts A1 and A2, expressed in the oxide form, was thus as follows: $MoO_3$=21.8% by weight, CoO=4.6% by weight and $P_2O_5$=7.1% by weight.

The calcined catalyst A2 was charged into a flushed bed unit and sulphurized using a straight run diesel supplemented with 2% by weight of dimethyldisulphide. A HDS test of a mixture of straight run diesel and diesel from catalytic cracking was then carried out for 300 h.

EXAMPLE 2

Preparation of Supplemented CoMoP Catalysts A3 to A8 (In Accordance with the Invention)

The catalysts A3 to A8 were prepared by impregnation of the dried pre-catalyst A1 with an aqueous solution containing bicine or tricine mixed with ammonia. The composition of the impregnated solutions is given in Table 1.

The impregnated pre-catalyst then underwent a maturation step for 3 h in air at ambient temperature, followed by a heat treatment step at 140° C. for 2 h in nitrogen (0.065 L/h/g of catalyst).

TABLE 1

Composition of solutions impregnated onto catalysts A3 to A8.

| | Zwitterionic molecule | | | | | |
| | Bicine | | | Tricine | | |
| Sample ref | A3 | A4 | A5 | A6 | A7 | A8 |
|---|---|---|---|---|---|---|
| Zwitterionic molecule/Mo (mol/mol) | 0.6 | 0.7 | 0.8 | 0.8 | 0.9 | 1 |
| Concentration of zwitterionic molecule in the solution (mol/L) | 2.2 | 2.6 | 3.0 | 3.0 | 3.4 | 3.7 |
| Mass of $NH_4OH$ (g) | 0.24 | 0.24 | 0.24 | 0.24 | 0.24 | 0.24 |
| pH of the solution | | | >10 | | | |

EXAMPLE 3

Comparative Test of Catalysts A1 to A8 in the Hydrogenation of Toluene in Cyclohexane under Pressure and in the Presence of Hydrogen Sulphide The catalysts described above were dynamically sulphurized in situ in the fixed flushed bed tube reactor of a pilot unit. The hydrogenating activity measurements were carried out immediately after sulphurization under pressure and without letting in air with the hydrocarbon feed which acted so sulphurize the catalysts.

The sulphurization and test feed was composed of 5.8% of dimethyldisulphide (DMDS), 20% of toluene and 74.2% of cyclohexane (by weight). The sulphurization was carried out at ambient temperature to 350° C., with a temperature ramp-up of 2° C./min, a HSV=4 $h^{-1}$ and $H_2$/HC=450 NL/L. The catalytic test was carried out at 350° C. at a HSV=2 $h^{-1}$ and $H_2$/HC equivalent to that for sulphurization, with a minimum of 4 test samples being taken, which were analysed by gas phase chromatography.

Thus, the stabilized catalytic activities of equal volumes of catalysts were measured for the toluene hydrogenation reaction. The detailed conditions for the activity measurement are given in Table 2.

TABLE 2

Conditions of toluene hydrogenation test.

| | |
|---|---|
| Total pressure | 6.0 MPa |
| Pressure of toluene | 0.37 MPa |
| Pressure of cyclohexane | 1.42 MPa |
| Pressure of methane | 0.22 MPa |
| Pressure of hydrogen | 3.68 MPa |
| Pressure of $H_2S$ | 0.22 MPa |
| Hourly space velocity | 2 $h^{-1}$ |
| Temperature of sulphurization and test | 350° C. |

Liquid effluent samples were analysed by gas phase chromatography. Determining the molar concentrations of unconverted toluene (T) and the concentrations of its hydrogenation products (methylcyclohexane (MCC6), ethylcyclopentane (EtCC5) and the dimethylcyclopentanes (DMCC5)) allowed a percentage toluene hydrogenation value, $X_{HYD}$, to be calculated, which is defined as follows:

$$X_{HYD}(\%) = 100 \times \frac{MCC6 + EtCC5 + DMCC5}{T + MCC6 + EtCC5 + DMCC5}$$

Since the toluene hydrogenation reaction is first order under the test conditions employed and the reactor behaves as an ideal piston reactor, the hydrogenating activity $A_{HYD}$ for the catalysts is calculated by applying the following formula:

$$A_{HYD} = \ln\left(\frac{100}{100 - X_{HYD}}\right)$$

Table 3 compares the relative hydrogenating activities of the catalysts, equal to the ratio of the activity of the supplemented catalyst over the activity of the calcined pre-catalyst A2 (not in accordance with the invention) taken as a reference (activity 100%).

TABLE 3

Relative activities in toluene hydrogenation test compared with
calcined catalyst A2 (not in accordance) for the hydrogenation of
toluene using the supplemented catalysts A3 to A8 (in accordance).

| Catalyst | Composition of supplementing solution | Relative $A_{HYD}$ compared with A2 (% ± 5%) |
|---|---|---|
| Calcined A2, not in accordance | — | 100 |
| A3 in accordance | Bicine/NH$_4$OH (Bicine/Mo = 0.6 mol/mol) | 115 |
| A4 in accordance | Bicine/NH$_4$OH (Bicine/Mo = 0.7 mol/mol) | 117 |
| A5 in accordance | Bicine/NH$_4$OH (Bicine/Mo = 0.8 mol/mol) | 123 |
| A6 in accordance | Tricine/NH$_4$OH (Tricine/Mo = 0.8 mol/mol) | 113 |
| A7 in accordance | Tricine/NH$_4$OH (Tricine/Mo = 0.9 mol/mol) | 112 |
| A8 in accordance | Tricine/NH$_4$OH (Tricine/Mo = 1.0 mol/mol) | 131 |

The results summarized in Table 3 show that all of the catalysts supplemented with bicine or tricine in a basic medium prepared in accordance with the invention have improved performances in the toluene hydrogenation test, compared with the calcined reference, which is not in accordance with the invention.

EXAMPLE 4

Comparative Test of Calcined Catalysts A2 (Not in Accordance with the Invention) and Catalysts A1 to A8 (In Accordance with the Invention) in the HDS of Diesel of Catalysts The catalysts A2 (not in accordance) and A3 to A8 (in accordance) were tested using diesel HDS. The composition of the feed is given in Table 4.

TABLE 4

Composition of diesel HDS feed.

| Density at 15° C. (g/cc) | | 0.8522 |
|---|---|---|
| Sulphur (% by weight) | | 1.44 |
| Simulated distillation | IP | 155° C. |
| | 10% | 247° C. |
| | 50% | 315° C. |
| | 90% | 392° C. |
| | EP | 444° C. |

The test was carried out in a flushed fixed bed isothermal pilot reactor, the fluids moving from bottom to top. After in situ sulphurization at 350° C. in the unit under pressure using the test diesel to which 2% by weight dimethyldisulphide had been added, the hydrodesulphurization test was carried out under the operating conditions shown in Table 5.

TABLE 5

Conditions for diesel hydrotreatment tests.

| Total pressure | 7 MPa |
|---|---|
| Volume of catalyst | 30 cm$^3$ |
| Flow rate of hydrogen | 24 L/h |
| Flow rate of feed | 60 cm$^3$/h |

The catalytic performances of the catalysts tested using diesel HDS are given in Table 6. They are expressed as the relative activity. The relative activity of the catalysts was measured by adjusting the temperature of the process in order to obtain a sulphur level of 10 ppm in the products formed. The lower this temperature is, the more active will the catalyst be. The activity of the calcined catalyst A2 was considered here to be the base performance.

TABLE 6

Relative diesel HDS activities compared with calcined catalyst
A2 (not in accordance) for the hydrotreatment of diesel for
supplemented catalysts A3 to A8 (in accordance).

| Catalyst | Composition of supplementing solution | Temperature to reach 10 ppm S in the effluents |
|---|---|---|
| Calcined A2, not in accordance | — | Base |
| A3 in accordance | Bicine/NH$_4$OH (Bicine/Mo = 0.6 mol/mol) | Base - 5° C. |
| A4 in accordance | Bicine/NH$_4$OH (Bicine/Mo = 0.7 mol/mol) | Base - 5° C. |
| A5 in accordance | Bicine/NH$_4$OH (Bicine/Mo = 0.8 mol/mol) | Base - 6° C. |
| A6 in accordance | Tricine/NH$_4$OH (Tricine/Mo = 0.8 mol/mol) | Base - 4° C. |
| A7 in accordance | Tricine/NH$_4$OH (Tricine/Mo = 0.9 mol/mol) | Base - 5° C. |
| A8 in accordance | Tricine/NH$_4$OH (Tricine/Mo = 1.0 mol/mol) | Base - 7° C. |

In a manner similar to the results obtained for toluene hydrogenation, the results summarized in Table 6 show that all of the catalysts supplemented with bicine or tricine in a basic medium prepared in accordance with the invention have improved performances for diesel HDS compared with the calcined reference which was not in accordance with the invention.

The examples show that the molecule in its zwitterionic form selected from the group formed by amino-alcohol acids containing secondary or tertiary amine groups and containing at least one carboxylic acid function and at least one alcohol function produce catalysts which are high performers by themselves without any need to add another molecule, for example a chelating agent.

The invention claimed is:

1. A process for the preparation of a catalyst starting from a pre-catalyst comprising at least one catalytic metal and a support, said pre-catalyst having undergone a heat treatment at at least 60° C. without calcining, in which process said pre-catalyst is impregnated with a basic solution having a pH of more than 7.5 and containing at least one molecule in the zwitterionic form, and the impregnated pre-catalyst is dried at a temperature of at most 240° C. without subsequent calcining, and the molecule in the zwitterionic form is selected from the group formed by amino-alcohol acids containing secondary or tertiary amine groups and containing at least one carboxylic acid function and at least one alcohol function.

2. The process according to claim 1, in which said molecule has a single carboxylic acid function.

3. The process according to claim 1, in which the molecule in the zwitterionic form is bicine.

4. The process according to claim 1, in which the molecule in the zwitterionic form is tricine.

5. The process according to claim 1, in which impregnation is carried out at a pH of more than 8.5.

6. The process according to claim 5, in which the base is ammonia.

7. The process according to claim 1, in which after impregnation, the pre-catalyst undergoes a maturation step.

8. The process according to claim 1, in which drying is carried out at a temperature in the range of 50° C. to 240° C.

9. The process according to claim 1, in which said pre-catalyst comprises at least one catalytic metal selected from the group formed by metals from group VIB and non-noble group VIII, and optionally comprises phosphorus.

10. The process according to claim 9, in which said pre-catalyst also comprises boron and/or silicon.

11. The process according to claim 1, in which said molecule is added in a quantity such that the molecule/GVIB molar ratio is in the range of 0.05 to 2.0.

12. The process according to claim 1, in which said pre-catalyst has been prepared by dry impregnation of said support with a solution of said catalytic metal.

13. The process according to claim 1, in which said pre-catalyst has been heat treated at a temperature in the range of 60° C. to 220° C.

14. The process according to claim 1, in which said catalyst undergoes sulphurization after said drying.

15. A catalyst which is susceptible of being prepared using the process in accordance with claim 1.

16. A process for the hydrotreatment and/or hydroconversion of a hydrocarbon feed by bringing said feed into contact with the catalyst according to claim 15, in which process said catalyst contains at least one metal from group VIB and at least one metal from group VIII and said metals are in the sulphide form.

17. The process according to claim 1, in which impregnation is carried out at a pH of more than 10.

18. The process according to claim 1, in which after impregnation, the pre-catalyst undergoes a maturation step for 0.1 to 10 h and at a temperature of 15° C. to 80° C.

19. The process according to claim 1, in which said pre-catalyst comprises at least one catalytic metal selected from the group formed by metals from group VIB and non-noble group VIII, and comprises phosphorus.

20. The process according to claim 1, in which said molecule is added in a quantity such that the molecule/Mo molar ratio is in the range of 0.05 to 2.0.

* * * * *